United States Patent

[11] 3,580,589

| [72] | Inventors | Herbert F. Prasse<br>Town and Country;<br>Loyd D. Hensley, Creve Coeur, Mo. |
|---|---|---|
| [21] | Appl. No. | 733,661 |
| [22] | Filed | May 31, 1968 |
| [45] | Patented | May 25, 1971 |
| [73] | Assignee | Ramsey Corporation<br>St. Louis, Mo. |

[54] CIRCUMFERENTIALLY EXPANDING OIL CONTROL RING
14 Claims, 10 Drawing Figs.

[52] U.S. Cl. ....................................... 277/140, 267/1.5
[51] Int. Cl. ....................................... F02f 5/00, F16j 9/00

[50] Field of Search............................................ 277/139- —141; 267/1.5

[56] References Cited
UNITED STATES PATENTS
| 3,460,846 | 8/1969 | Schmidt et al. ............... | 277/140 |
| 3,485,504 | 12/1969 | Wells............................. | 277/140 |

*Primary Examiner*—Samuel B. Rothberg
*Attorney*—Hill, Sherman, Meroni, Gross & Simpson ABSTRACT: A circumferentially expanding ring for spacing and expanding rail rings in a piston ring groove which ring has a plurality of integrally connected circumferentially spaced sections having upper and lower U-shaped lands integrally connected by axially upstanding lands and tongues projecting from some of the axially upstanding lands between the U-shaped lands to reinforce the upper and lower lands against collapse and/or to provide rail ring supports.

PATENTED MAY 25 1971

INVENTORS
Herbert F. Prasse
Loyd D. Hensley

BY Hill, Sherman, Meroni, Gross & Simpson

ATTORNEYS

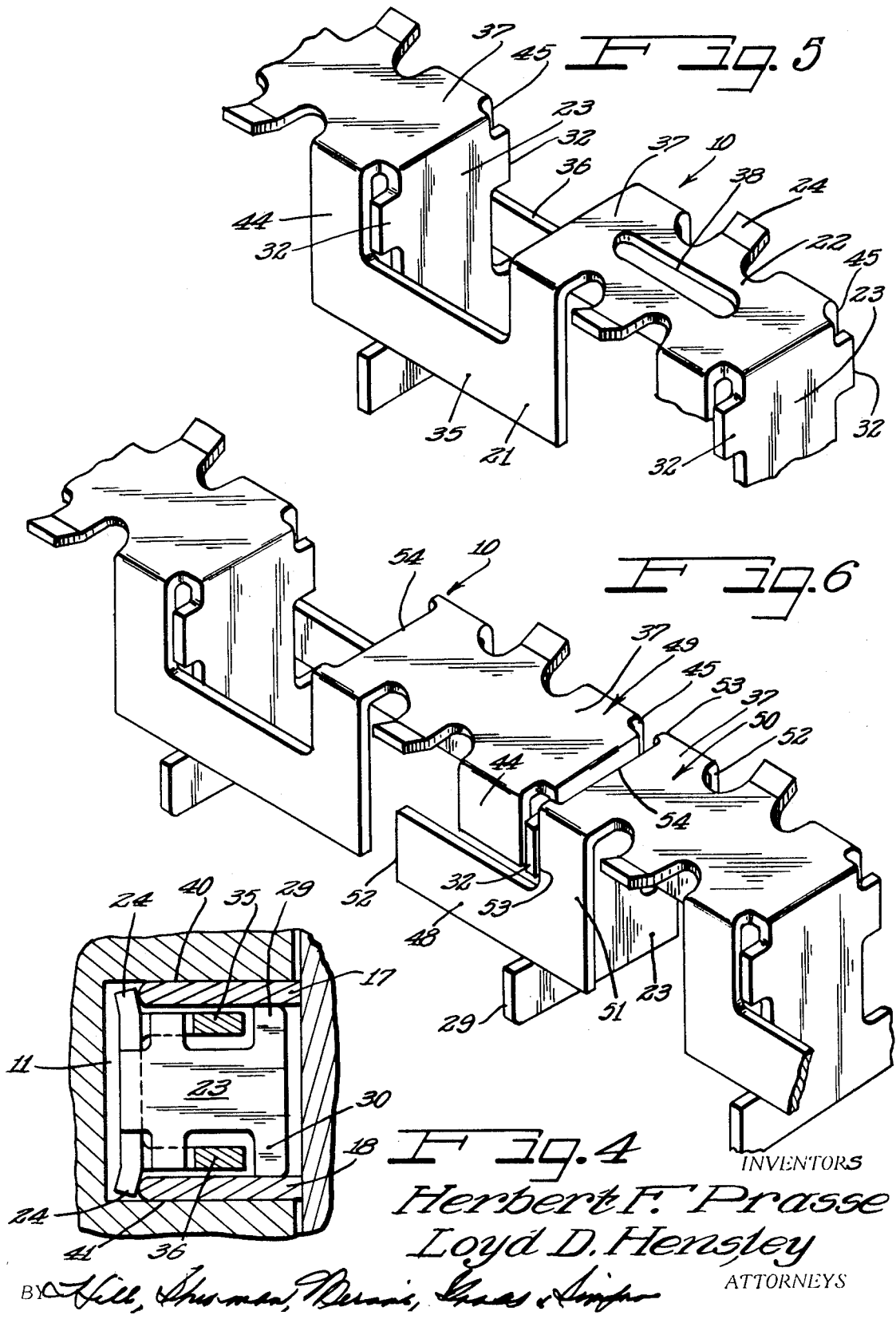

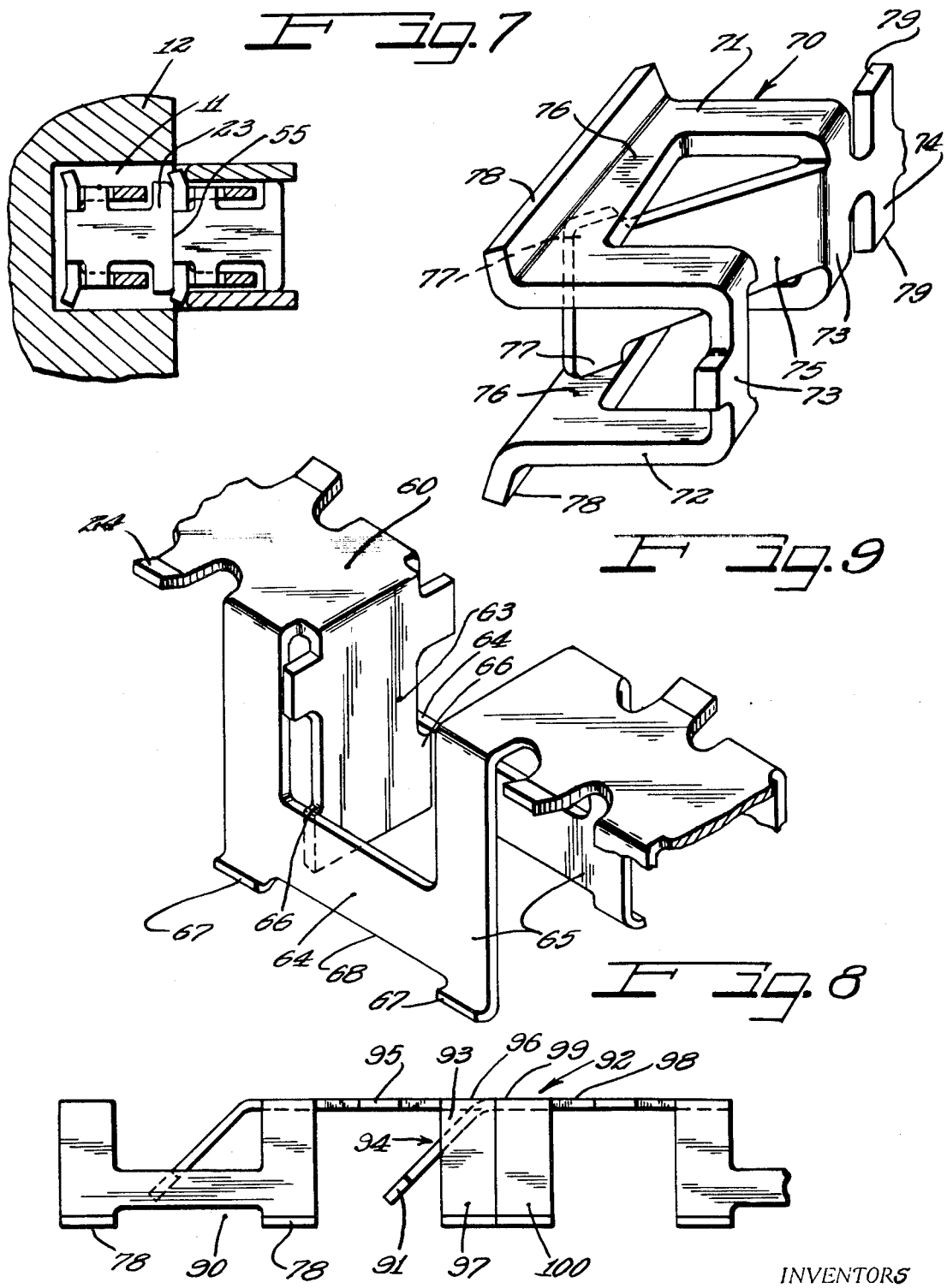

CIRCUMFERENTIALLY EXPANDING OIL CONTROL RING

BACKGROUND OF THE INVENTION

1. Field of the Invention

This invention relates to piston ring expanders and more particularly to a novel circumferential expander ring adapted to space and expand split rail rings.

2. Description of the Prior Art

Circumferentially expanding metal rings for use in piston grooves to expand the piston rings into sealing contact with the cylinder wall are known to the art. Such circumferential expanders are usually either of the radially corrugated or circumferentially segmented types and it has been known to use circumferentially segmented U-shaped cross section rings to expand and axially space two thin rail rings in a single piston groove for oil control purposes. See for example the U.S. Pat. No. 3,381,971 to Mayhew.

The circumferentially segmented U-shaped spacer expanders may be designed either with the U opening towards the cylinder wall or with the U opening into the piston groove. In many of the prior-art expanders of this type, the rail rings contact the upper and lower surfaces of the spacer expander to a rather large extent providing large contact areas which could result in adhesion of the rail rings to the expander when varnish and other deposits build up on the ring assembly. See for example the U.S. Pat No. 3,323,807 to Vanderbilt, Jr. Additional disadvantages to be found in the prior art include the fact that the rails are, in many instances, supported by the flexing spring members of the expander spacer thereby providing a wear-causing moving interface and the fact that in many instances the flexing or deflection of the spring member changes the axial height of the ring assembly. Additionally, prior-art circumferentially segmented expansion rings required extensive tooling changes to differ the ring height for differing width grooves.

A desirable criterion in circumferentially segmented U-shaped expander spacers is the provision of means limiting axial deflection of the legs of the U. In the past this has been provided either by turning up the legs of the U thereby making the spring member substantially square, see for example the U.S. Pat. No. 3,136,559 to Hamm or by connecting the axially spaced lands of the U with axially extending legs integral with the lands as in the above-mentioned Mayhew patent, U.S. Pat. No. 3,381,971.

Another important feature is to prevent installation overlap at the split ends of the ring.

SUMMARY

The above-mentioned disadvantages of the prior-art rings are overcome by the present invention which also provides antioverlap and axial spacing features. The ring is punched from a strip of metal in such a manner that the standard metalworking operations of cutting, punching and bending are all that is required to form the ring thereby eliminating difficult and expensive production steps. The ring consists basically of a series of circumferentially spaced U-shaped upper and lower axially spaced lands integrally connected around the periphery at the termination of the legs of the U by axially upstanding lands to provide spring members creating the circumferential expansion force. Adjacent members are connected through connecting lands colinear with the upstanding lands. The connecting lands may project axial tabs to bear against the rail rings in the case of outwardly opening U-shaped rings. Tongues projecting from one of the axially upstanding lands of each segment extend between the top and bottom lands either to provide support against axial collapse of the lands or to project therebeyond to provide axially extending tabs on which the rail rings rest. In one embodiment of the invention an interlocking end is provided to accurately mate the split ends of the ring and to prevent overlap installation.

It is therefore an object of this invention to provide a new and improved expander-spacer ring for internal combustion engines.

It is a further object of this invention to provide an improved expander-spacer ring of the circumferentially segmented U-shaped type.

It is a further and more specific object of this invention to provide a circumferentially segmented expander-spacer ring having axially spaced top and bottom U-shaped spring lands connected by axial lands some of which have tongues projecting therefrom which extend between the top and bottom lands.

Other and further objects of this invention will be apparent to those skilled in this art from the following detailed description of the annexed sheets of drawings which, by way of preferred embodiments of the invention, illustrate several examples of the invention.

BRIEF DESCRIPTION OF THE DRAWINGS

FIG. 4 is an enlarged transverse sectional view generally taken along the lines IV-IV of FIG. 1;

FIG. 5 is an enlarged fragmentary isometric view of the spacer expander ring of this invention;

FIG. 6 is an enlarged fragmentary isometric view of the expander-spacer ring of this invention illustrating an interlocking split end arrangement;

FIG. 7 is a view similar to FIG. 4 illustrating the manner which an interlocking end assembly of this invention will prevent overlapped installation in a cylinder;

FIG. 8 is an enlarged fragmentary isometric view of another embodiment of the expander spacer of this invention;

FIG. 9 is an enlarged fragmentary isometric view of still another embodiment of the expander-spacer ring of this invention; and FIG. 10 is a fragmentary plan view of the expander-spacer ring of FIG. 9.

AS SHOWN ON THE DRAWINGS

Figure 1:
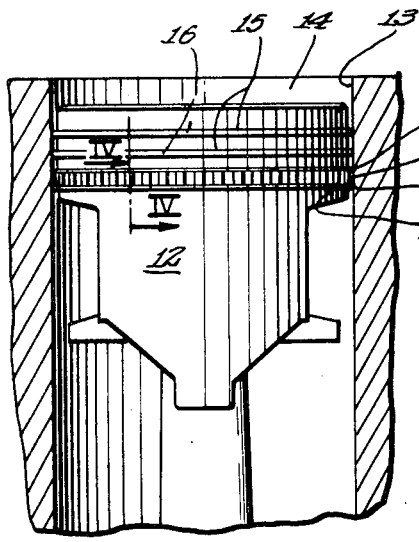
FIG. 1 is a fragmentary sectional view with parts in elevation of a cylinder and piston assembly, including an oil ring assembly according to this invention.

The expander-spacer ring 10 of this invention is illustrated in FIG. 1 in operating position in the oil ring groove 11 of a piston 12 received in a cylinder 13. The piston 12 has a head 14 with a plurality of ring grooves therearound including two top grooves 15 containing conventional solid metal piston rings 16 and the oil ring groove 11 which contains the expander spacer 10 of this invention and two split rails rings 17 and 18 which are expanded thereby into contact with the wall of the cylinder 13.

Figure 2:
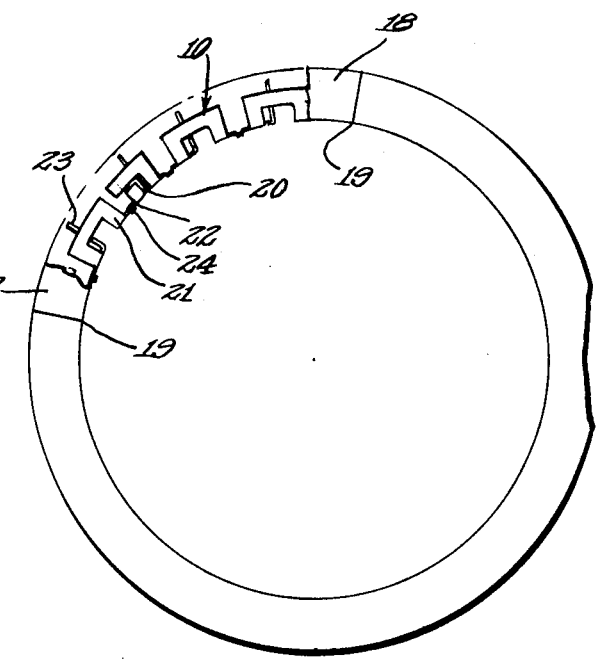
FIG. 2 is a plan view of the oil control assembly of FIG. 1 with parts broken away to show the expander-spacer ring.

As shown in FIG. 2 the rail rings 17 and 18 are split as at 19 and the expander spacer 10 is split as at 20. The expander spacer 10 has a plurality of circumferentially spaced spring sections 21 integrally connected with each other through connecting lands 22. Tongues 23 project radially outward and support the outer portions of the rings 17 and 18. Tabs 24 on the connecting lands 22 engage the rings 17 and 18 at spaced intervals around their inner peripheries.

Figure 3:
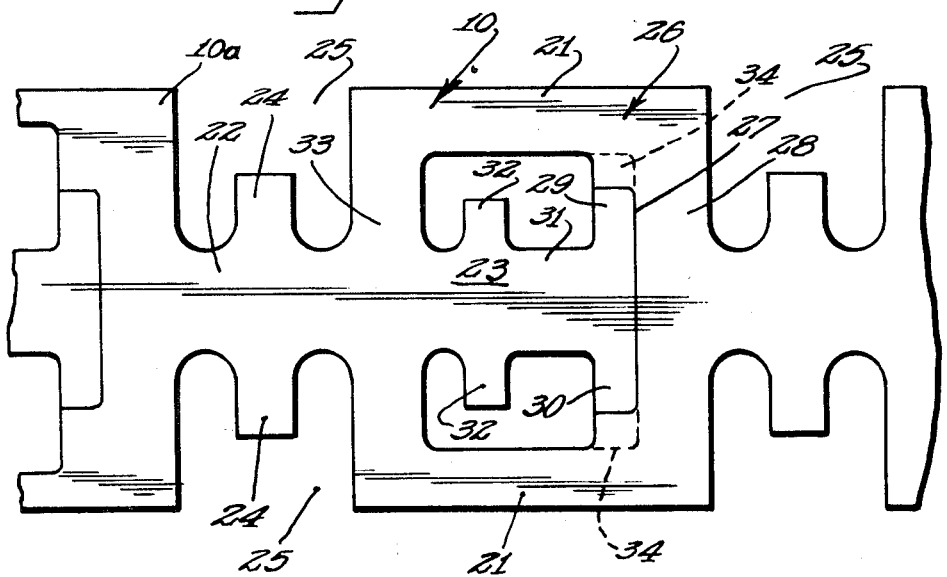
FIG. 3 is a fragmentary plan view of a punched metal strip from which the expander spacer of this invention is formed.

As illustrated in FIG. 3 the expander spacer 10 is formed from a strip of metal 10a which is punched and then bent. The connecting lands 22 and tabs 24 are formed by equal substantially W-shaped punched out areas 25 spaced along the longitudinal axis and extending in spaced relationship from the longitudinal axis of the strip 11 to the edges thereof, the tabs 24 being formed substantially as the central projection of the W. The areas 26 between the W areas 25 are then cut and punched to form the segments 21 and tongues 23. The areas 26 are cut substantially as hollow rectangles with the longitudinal axis of the area left uncut and punched out at one end 27 so that the longitudinal axis then may be bent back to form the tongue 23. The ring is then formed by bending the tongue outwardly and thereafter bending the outside walls of the hollow rectangle outwardly to form a U-shaped cross section spring member with the tongue projecting therethrough. When the end 27 of the tongue is punched from the metal of the area 26 it may be punched from a portion extending into the end wall 28 of the hollow rectangle. The portion punched includes transversely extending tabs 29 and 30 which extend beyond the main stem portion 31 of the tongue. An additional set of transversely extending tabs 32 are formed in spaced relation to the sidewall 33 of the hollow rectangle from which the tongue projects. The areas 34, indicated by dotted lines in FIG. 3, left unpunched by the formation of the tabs 29 and 30 from the material of the end wall 28 may be left unpunched or may be further cut and punched out.

The punched metal strip is then bent to form the ring in a shape illustrated in FIGS. 4 and 5. The spring sections 21 are formed by bending the hollow rectangle into a U-shaped cross-sectional figure with the tongue 23 bent in the same direction and projecting beyond the spring section. Each spring section then consists of top 35 and bottom 36 axially spaced lands which are substantially U-shaped opening radially inwardly. The top and bottom lands are integrally connected at the inner periphery of the legs of the U by axially upstanding lands 37 which comprise the end walls of the hollow rectangle. Adjacent sections 21 are integrally connected around the inner periphery through connecting lands 22. Tabs 24 project axially from the connecting lands 22 and may be angled inwardly or outwardly to insure side sealing of the rail rings to the radial walls of the ring groove. Additionally oil drainage holes 38 may be provided through the connecting lands to aid in proper drainage.

The circumferential expansion force of the ring 10 is generated through flexing of the legs of each U-shaped top and bottom land in each segment. In some prior-art expansion rings the flexing of the ring necessary to create the circumferential expansion force could affect the axial dimensions of the ring.

It can be seen from FIG. 4 that the rail rings 17 and 18 contact the expansion ring around their inner periphery only at the tabs 24 and adjacent their outer periphery at the tabs 29 and 30 of the tongue 23. Any possible axial change in the spacing between the lands 35 and 36 cannot affect the spacing of the rails 17 and 18. Further, the angling of the tabs 24 urges the rails into side sealing contact with the radial walls 40 and 41 of the ring groove 11.

The tabs 32 projecting from the tongue 23 intermediate the ends thereof act as a backstop against the legs 44 and 45 of the top and bottom lands thus aiding in the forming of the ring during the bending operation and preventing excessive bending of the tongue both during formation and operation.

Because the rail rings 17 and 18 are axially supported only by the tabs 29 and 30 and do not contact the spring section 21, the small contact area presented will resist adhesion of the rail rings to the expander spacer when varnish and other deposits build up on the ring assembly during operation.

FIG. 6 illustrates a novel end abutment for the expander-spacer ring 10. The end abutment provides for an interlocking fit between the split ends of the ring and prevents overlapped installation of the ring in the ring groove. The top and bottom lands of the abutting spring members are cut in such a way that the bight portions 48 of one of the segments project circumferentially beyond and radially inwardly of the leg portions 44 and 45 of the other abutting segment. The leg portions 44 and 45 terminate radially outwardly approximately even with the radially outermost portion of the tab 32 in a plane normal to the radial projection. The tongue 23 still projects from the axially upright land 37 adjacent the legs 44 and 45 but the bight portions of the top and bottom lands which would normally be connected to the legs 44 and 45 as well as the remainder of the segment are not present. Therefore, the one abutting segment 49 consists of the axially upright land 37, the tongue 23 and the shortened legs 44 and 45. The other abutting segment 50 consists of the axially upright land 37 of that segment from which the tongue does not project the radial legs 51 and 52 of the top and bottom U-shaped lands and the bight portions 48 of those lands. The bight portions 48 are terminated at 52 prior to the point from which legs equivalent to legs 44 and 45 would normally be joined for the completion of the section 50.

In assembly, the bight portions 52 of the section 50 are projected between the tabs 32 and the tabs 29 and 30 of the tongue 23 of the section 49 and extend in spaced relation radially outwardly from the shortened legs 44 and 45. In this manner the inner radial faces 53 of the legs 51 and 52 can contact the tabs 32 of the tongue 23. Additionally a U-shaped portion 54 of the axially upstanding land 37 of the segment 50 may be blanked out to provide a space to receive the radially innermost portion of the tongue 23 and allow relative movement of the sections 49 and 50 during operation of the assembly without contact between the tongue 23 and the axially upstanding land 37 of the section 50.

FIG. 7 illustrates the effect of attempted overlap installation of the ring assembly in the ring groove which is prevented by the tongue 23 of the radial inner portions of the overlapped assembly striking the radial inner periphery 55 of the radial outer portions of the overlapped ring. This produces an overlapped ring which has a radial dimension greater than the depth of the ring groove 11 so that the piston 12 could not be received within the cylinder bore 13 with the assembly in its overlapped condition.

It can further be seen from FIG. 4 that the same basic tooling used to produce the ring can accommodate different axial ring groove dimensions simply by extending the axial projections of the tabs 24 and 29 and 30 thereby allowing expander spacers of differing axial dimensions to be produced on substantially the same metal forming equipment without expensive tooling changes.

FIG. 8 illustrates a modification of the basic expander-spacer ring described above. In this embodiment the ring 60 is also a radially outwardly opening U-shaped cross section expander spacer as in the previous embodiment and differs only in that the tongue 63 is shortened so that it does not project beyond the bight portions 64 of the top and bottom U-shaped lands 65. Axial projections 66 projecting from a peripheral portion of the tongue 63 contact the undersides of the bight portions 64 thereby preventing axial collapse of the spring member.

In order to provide support for the rail rings radially outwardly from the tabs 24 of the connecting lands, portions of the outer periphery of the top and bottom lands of the spring member are bent axially outwardly to form rail-supporting tabs 67. The portion 68 of the lands between the rail-supporting tabs 67 is blanked out. In this manner the rail rings contact the expander spacers 60 only at the tabs 24 of the connecting lands and at the projecting tabs 67 of the top and bottom lands. It is of course to be understood that although FIG. 9 illustrates the tongue 63 as projecting substantially radially outward, the projection could be at a smaller angle thereby placing the tab 66 more nearly intermediate the legs of the U-shaped top and bottom segments.

FIGS. 9 and 10 illustrate a further embodiment of this invention. In this embodiment the expander-spacer ring 70 is an inwardly opening U-shaped cross section having top and bottom U-shaped lands 71 and 72 connected integrally at the outer periphery of the legs of the U-shaped lands through axially upright lands 73 to provide the spring member sections. Adjacent sections are connected through connecting lands 74 disposed around the outer periphery of the ring connecting the axial upright lands 73. A tongue 75 projects from one of the axial upright lands 73 of each segment at an angle thereto. The tongue 75 projects between the bight portions 76 of the top and bottom lands and terminates in axially extending tabs 77 which act as an internal support preventing axial collapse of the top and bottom lands.

The inner peripheral portions 78 of the top and bottom lands are bent axially outward to provide abutting tabs urging the rail rings circumferentially outward. In this embodiment the rail rings can either be allowed to contact the axial outer surface of the top and bottom lands 71 and 72 as well as the tab 78 or the connecting land 74 can be provided with axially extending tabs 79 to space and support the rail rings.

As shown in FIG. 10 the inner periphery of the top and bottom lands can be further modified by providing U-shaped cutouts 90 intermediate the legs of the U of the top and bottom lands thereby breaking up the rail-urging tab 78. FIG. 10 also illustrates an interlocking end abutment for the modified ring of FIG. 9 wherein the tongue 91 of one spring member segment 92 projects between a portion of the top and bottom lands 93 of the abutting section 94. In this embodiment the abutting segment 94 is circumferentially cut off adjacent the legs of the top and bottom U-shaped lands thereby providing a segment which consists solely of the connecting land 95, the axial upright land 96, and the corresponding legs of the top and bottom land 97 integrally connected to the axial upright land 96. The segment 92 consists of the connecting land 98 attached thereto, the axial upright land 99 and the corresponding legs 100 of the top and bottom land integral with the axial upstanding land 92. The tongue 91 projects from the upstanding land 92 between the legs 97 of the segment 93 to provide an interlocking fit.

It can therefore be seen from the above that our invention provides for new and improved expander spacer ring consisting of a plurality of circumferentially spaced U-shaped cross section spring members having top and bottom U-shaped lands integrally connected by axial upright lands one of which has a tongue projecting therefrom extending between portions of the top and bottom lands, each of the segments being connected to an adjacent segment through an integral connecting land.

Although we have herein set forth our invention with respect to certain specific principles and details thereof, it will be understood that these may be varied without departing from the spirit and scope of the invention as set forth in the hereunto appended claims.

We claim as our invention:

1. A circumferential split expander spacer ring for piston rings which comprises: a plurality of circumferentially spaced sections, each section having axially spaced substantially U-shaped lands with radially inwardly directed legs, said lands being connected at the inner periphery of said legs by axially upstanding lands, a tongue projecting from some of said upstanding lands at an angle thereto, said tongue extending from the inner diameter substantially radially between said axially spaced top and bottom lands circumferentially between said legs, axially projecting rail ring contacting tabs on the inner diameter, and the axially upstanding lands of adjacent sections being integrally connected.

2. In a U-shaped cross section spacer-expander ring having a plurality of circumferentially spaced spring segments consisting of top and bottom U-shaped lands integrally connected by axially upright lands with adjacent segments connected integrally through connecting lands, the improvement of a tongue projecting from one of the axially upright lands of some of said segments and extending between the top and bottom lands of said segments in an area intermediate the legs thereof, and axially projecting rail ring contacting tabs extending axially beyond the top and bottom portions of the said connecting lands and integral therewith.

3. An expander spacer ring for supporting and expanding rail rings which comprises: a plurality of circumferentially spaced spring members having upper and lower spring sections integrally connected through axially upstanding lands, adjacent members integrally connected, axially projecting portions around the inner diameter of said ring effective to circumferentially expand the rail rings when said expander-spacer ring is compressed, and a plurality of tongues projecting from some of said axially upstanding legs at an angle thereto and extending between said upper and lower sections, the said tongues projecting from the inner diameter substantially radially, the said tongues projecting from the inner diameter at a point circumferentially spaced from the said axially projecting portions.

4. A circumferential expander spacer ring for circumferentially expanding axially spaced rail rings in a piston groove which comprises; a plurality of circumferentially spaced outwardly opening U-shaped cross section spring members having top and bottom inwardly opening U-shaped lands integrally connected through axially upright legs disposed around the inner periphery thereof, connecting lands connecting the axially upright legs of adjacent spring members, tongues projecting from one of the legs of at least some of the members at an angle thereto, said tongues extending between the said U-shaped lands of the said member radially beyond said lands, said tongues having axial projections thereon adjacent the outer periphery thereof, said projections extending axially beyond the said lands to provide support tabs to axially space the rail rings, and said connecting lands having axial projections extending axially beyond the said top and bottom lands for engaging and circumferentially expanding the said rail rings.

5. The expander spacer of claim 4 wherein oil drainage holes are provided through the said connecting lands.

6. The expander ring of claim 4 wherein the said tongue has at least one axial tab projecting therefrom intermediate the inner and outer periphery thereof adapted to engage a radial wall of one of said top or bottom lands to restrict bending of the said tongue during formation or operation of the said expander-spacer ring.

7. The expander-spacer ring of claim 4 wherein the axial projections of the said connecting lands have portions thereof angled radially from the axial portions, said portions adapted to engage the said rail rings at an angle to the axis thereof to provide side sealing of the rail rings to the radial walls of the piston groove.

8. A circumferential expander-spacer ring for axially spacing and circumferentially expanding rail rings in a piston groove which comprises: a plurality of circumferentially spaced spring members each member having axially upstanding portions connecting radially extending axially spaced spring portions, adjacent spring members integrally connected through connecting lands, axially upstanding tabs around the inner periphery of said ring adapted to engage and expand said rail rings, a tongue projecting from one of the axially upstanding portions of at least some of the members, said tongue extending between the axially spaced spring portions, and said ring split and having abutting ends, said tongue projecting from the outer diameter of the ring and terminating adjacent the inner diameter underlying portions of axially aligned spring members.

9. The ring of claim 8 wherein a tongue on one of the abutting ends extends beyond said end into interlock relation with the other of said abutting ends to prevent overlapped installation of the said ends.

10. A split circumferential expander-space ring for axially spacing and circumferentially expanding rail rings in a piston groove which comprises; a plurality of circumferentially spaced spring members having upper and lower outwardly opening U-shaped spring sections the said sections of each member integrally connected by axially upstanding legs disposed around the outer periphery of the said ring, a tongue projecting from one of the legs of at least some of the members, said tongue extending radially inwardly and terminating axially between the bight portions of the said upper and lower spring sections to prevent axial collapse of the said members, an inner peripheral portion of the said upper and lower sections having integral axial projections extending axially outwardly therefrom to engage and expand the rail rings when the expander-spacer ring is in a compressed operating position.

11. A spacer-expander ring comprising; a plurality of circumferentially spaced spring members having upper and lower axially spaced U-shaped spring lands, the upper and lower lands of each member integrally connected through axially upstanding lands, adjacent members integrally connected through connecting lands disposed around the inner periphery of the said ring, a tongue projecting from one of the axially upstanding lands of at least some of the members, said tongue extending axially between the bight portions of the said upper and lower lands remote from the said axially upstanding land, said tongue adapted to prevent axial collapse of the said upper and lower lands, and axial projections circumferentially spaced around the inner periphery of said ring to engage and expand rail rings.

12. The ring of claim 11 wherein portions of the outer periphery of the said upper and lower lands project axially outwardly to engage and axially space rail rings.

13. An expander-spacer ring for supporting and expanding axially spaced rail rings which comprises: a ring having top and bottom rows of circumferentially spaced spring segments, axially upstanding inner diameter lands supporting the rows in spaced relation and connecting adjacent segments, said ring having axially extending tabs on its inner periphery for engaging the inner peripheries of said rail rings to expand the said rail rings when the expander spacer is circumferentially compressed, and tongues projecting from the upstanding lands between the top and bottom rows of segments having means projecting axially beyond the segments to support the rail rings near their outer peripheries.

14. A U-shaped cross section spacer-expander ring comprising a plurality of circumferentially spaced spring segments consisting of top and bottom U-shaped lands having radially extending circumferentially spaced legs, the legs of each top land axially aligned with the legs of a bottom land, each of said legs connected with an aligned leg by an axially upright land with adjacent segments connected integrally through axially extending connecting lands connected to adjacent upright lands, a tongue projecting from one of the axially upright lands of some of said segments and extending between the top and bottom lands of said segments in an area intermediate the legs thereof.